(12) United States Patent
Bonanno et al.

(10) Patent No.: US 8,028,180 B2
(45) Date of Patent: Sep. 27, 2011

(54) METHOD AND SYSTEM FOR POWER CONSERVATION IN A HIERARCHICAL BRANCH PREDICTOR

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 12/034,025

(22) Filed: Feb. 20, 2008

(65) Prior Publication Data

US 2009/0210730 A1 Aug. 20, 2009

(51) Int. Cl.
*G06F 1/32* (2006.01)
*G06F 15/00* (2006.01)

(52) U.S. Cl. ......... 713/320; 713/300; 712/239; 712/240
(58) Field of Classification Search .................. 713/300, 713/320; 712/239, 240
See application file for complete search history.

(56) References Cited

U.S. PATENT DOCUMENTS

| | | | | |
|---|---|---|---|---|
| 5,996,083 | A * | 11/1999 | Gupta et al. .................. | 713/322 |
| 6,263,428 | B1 * | 7/2001 | Nonomura et al. ........... | 712/239 |
| 6,988,213 | B1 * | 1/2006 | Khazam ........................ | 713/320 |
| 7,130,991 | B1 * | 10/2006 | Butler .......................... | 712/241 |
| 7,254,693 | B2 * | 8/2007 | Eisen et al. ................... | 712/23 |
| 7,437,581 | B2 * | 10/2008 | Grochowski et al. ......... | 713/320 |
| 7,681,021 | B2 * | 3/2010 | Schuler et al. ................ | 712/238 |
| 2005/0223203 | A1 * | 10/2005 | Loh .............................. | 712/239 |
| 2006/0069936 | A1 * | 3/2006 | Lint et al. ..................... | 713/320 |
| 2006/0101299 | A1 * | 5/2006 | Chung .......................... | 713/324 |
| 2008/0082843 | A1 * | 4/2008 | Schuler et al. ................ | 713/323 |

OTHER PUBLICATIONS z/Architecture, Principles of Operation, Sixth Edition, Apr. 2007, Publication No. SA22-7832-05, copyright IBM Corp. 1990-2007, pp. 1-1218.
Daniel Angel Jimenez, Delay-Sensitive Branch Predictors for Future Technologies, PhD Thesis, University of Texas at Austin, Jan. 2002, 165 pages.

* cited by examiner

*Primary Examiner* — Vincent Tran
*Assistant Examiner* — Zahid Choudhury
(74) *Attorney, Agent, or Firm* — Cantor Colburn LLP; John Campbell (57) ABSTRACT

A method and system for power conservation in a hierarchical branch predictor system are provided. The method includes addressing multiple branch predictors, each of the branch predictors having various sizes of hierarchical storage and storing information about previously encountered branch instructions. In response to receiving a first branch prediction from one of the branch predictors, the method includes comparing the first branch prediction with previously stored branch predictions to determine the existence of a branch prediction loop, the branch prediction loop including a sequence of branch predictions that repeat as long as constituent predictions of the branches remain unchanged. Upon determining that a branch prediction loop exists, the method includes associating the branch prediction loop with the branch predictors that provided each branch prediction, and activating power saving to the branch predictors that are not associated with the branch prediction loop.

16 Claims, 5 Drawing Sheets

| EXAMPLE NUMBER | LOOP LENGTH | OLDEST (1ST) PREDICTION BEING REMEMBERED | 2ND PREDICTION BEING REMEMBERED | YOUNGEST (3RD) PREDICTION BEING REMEMBERED |
|---|---|---|---|---|
| 1 | 1 | | A, BTB1, TAKEN | A, BTB1, TAKEN |
| 2 | 2 | A, BTB1, TAKEN | B, BTB1, TAKEN | A, BTB1, TAKEN |
| 3 | 2 | A, BTB1, TAKEN | B, BTB1, NOT-TAKEN | A, BTB1, TAKEN |
| 4 | 2 | A, BTB1, NOT-TAKEN | B, BTB1, TAKEN | A, BTB1, NOT-TAKEN |

METHOD AND SYSTEM FOR POWER CONSERVATION IN A HIERARCHICAL BRANCH PREDICTOR

BACKGROUND OF THE INVENTION

The present disclosure relates generally to branch prediction in a processor pipeline and, in particular, to a method and system for power conservation in a hierarchical branch predictor.

A basic pipeline microarchitecture of a microprocessor processes one instruction at a time. The typical dataflow for an instruction follows the steps of: instruction fetch, decode, execute, and result write back. Each stage within a pipeline or pipe must occur in order and hence a given stage cannot progress unless the stage in front of it is progressing. In order to achieve the highest performance, one instruction will enter the pipeline every cycle. Whenever the pipeline has to be delayed or cleared, this adds latency which, in turn, can be monitored by the performance of a microprocessor as it carries out a task.

There are many dependencies between instructions that prevent the optimal case of a new instruction entering the pipe every cycle and which add latency to the pipe. One category of latency contribution deals with branches. When a branch is decoded, it can either be taken or not taken. A branch is an instruction which can either fall through to the next sequential instruction (not taken) or branch off to another instruction address (taken), and carry out execution of a different series of code. At decode time, the branch that is detected must wait to be resolved in order to know the proper direction in which the instruction stream is to proceed. Waiting for potentially multiple pipeline stages for the branch to resolve the direction in which to proceed adds latency into the pipeline. To overcome the latency of waiting for the branch to resolve, the direction of the branch can be predicted such that the pipe begins decoding either down the 'taken' or 'not taken' path. At branch resolution time, the guessed direction is compared to the actual direction the branch was to take. If the actual direction and the guessed direction are the same, then the latency of waiting for the branch to resolve has been removed from the pipeline. If, however, the actual and predicted directions miscompare, then the decoding performed down the improper path (and all instructions in this path behind that of the improperly guessed direction of the branch) must be flushed out of the pipe, and the pipe must be restarted at the correct instruction address to begin decoding the actual path of the given branch. Because of the controls involved with flushing the pipe and beginning over, there is a penalty associated with the improper guess and latency is added into the pipe, as compared to simply waiting for the branch to resolve before decoding further. By having a high rate of correctly guessed paths, the ability to remove latency from the pipe outweighs the latency added to the pipe for guessing the direction incorrectly.

In order to improve the accuracy of the guess associated with a branch, a branch history table (BHT) can be implemented, which allows for direction guessing of a branch based on the past behavior of the direction the branch previously went. If the branch is always taken, as is the case of a subroutine return, then the branch will always be guessed as taken. However, IF/THEN/ELSE structures become more complex in their behavior. For example, a branch may be always taken, sometimes taken and not taken, or always not taken.

When a branch is guessed taken, the target of the branch is to be decoded. The target of the branch is acquired by making a fetch request to the instruction cache for the address which is the target of the given branch. Making the fetch request out to the cache involves minimal latency if the target address is found in the first level of cache. However, if there is not a hit in the first level of cache, then the fetch continues through the memory and storage hierarchy of the machine until the instruction address for the target of the branch is acquired. Therefore, any given taken branch detected at decode has a minimal latency associated with it that is added to the amount of time it takes the pipeline to process the given instruction. Upon missing a fetch request in the first level of memory hierarchy, the latency penalty the pipeline pays grows higher and higher the further up the hierarchy the fetch request must progress until a hit occurs. In order to hide part or all of the latency associated with the fetching of a branch target, a branch target buffer (BTB) can work in parallel with a BHT.

Given a current address which is currently being decoded, the BTB can search for the next instruction address from this point forward which contains a branch. Along with storing the instruction addresses of branches in the BTB, the target of the branch is also stored with each entry. With the target being stored, the address of the target can be fetched before the branch is ever decoded. By fetching the target address ahead of decode, latencies associated with cache misses can be minimized to the point of the time it takes between the fetch request and the decode of the branch.

A hierarchical branch predictor can improve performance by balancing latency and capacity effects. Such a configuration consists of multiple predictors of varying sizes and latencies since larger structures have longer access times than smaller ones. In a hierarchical predictor, power is consumed in order to access all of the structures in parallel. However, in cases where only some levels of the hierarchy are sufficient to provide accurate branch predictions, power is wasted by accessing the unused levels of the hierarchy.

It would be beneficial to conserve power in a hierarchical predictor. Accordingly, there is a need in the art for an approach to perform hierarchical branch prediction processes that conserve power.

BRIEF SUMMARY OF THE INVENTION

Embodiments of the invention include a method for power conservation in a hierarchical branch predictor. The method includes addressing multiple branch predictors in parallel or sequentially, each of the branch predictors having various sizes of hierarchical storage and storing information about previously encountered branch instructions. In response to receiving a first branch prediction from one of the branch predictors, the method includes comparing the first branch prediction with previously stored branch predictions to determine the existence of a branch prediction loop, the branch prediction loop including a sequence of branch predictions that repeat as long as constituent predictions of the branches remain unchanged. Upon determining that a branch prediction loop exists, the method includes associating the branch prediction loop with the branch predictors that provided each branch prediction, activating power saving to the branch predictors that are not associated with the branch prediction loop to save power, and deactivating power saving upon determining that branch predictions are needed from predictors not associated with the branch prediction loop.

Additional embodiments include a system for power conservation in a hierarchical branch predictor.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An exemplary embodiment includes a system and method implementing an enhanced performance hierarchical branch predictor that conserves power. A repeating loop of branch predictions can be detected, which is then used to determine which levels of the prediction hierarchy are needed for providing accurate branch predictions. Any levels of the hierarchy that are not needed to predict the branches in the loop are turned off in order to save power.

Figure 1:
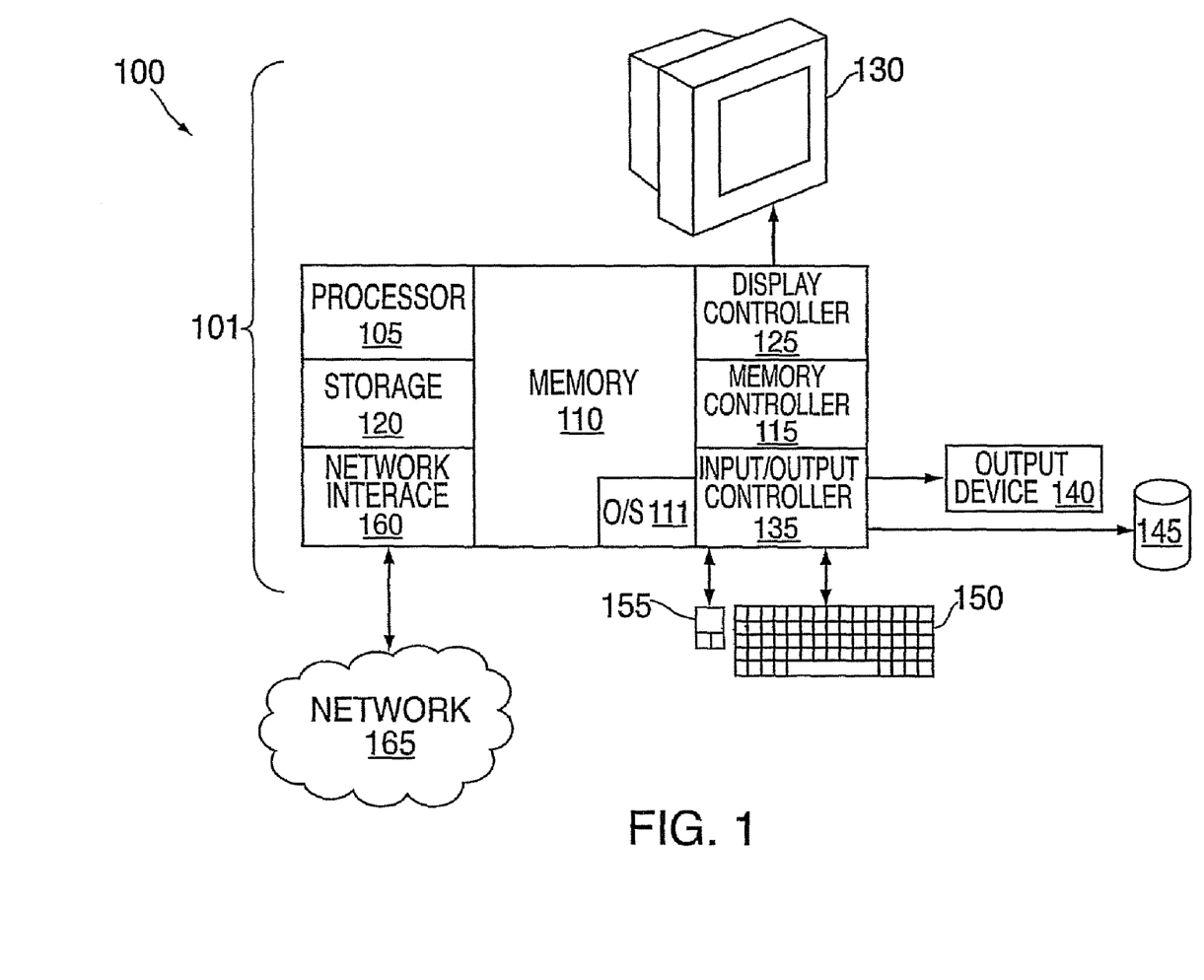
FIG. 1 illustrates a block diagram of a system in accordance with an exemplary embodiment.

FIG. 1 illustrates a block diagram of a system 100 for implementing branch predictor processes in accordance with an exemplary embodiment. The methods described herein can be implemented in hardware, software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor may include one more units, e.g., instruction fetch units (IFUs), fixed-point execution units (FXUs), branch resolution units (BRUs), and floating point units (FPUs), among other units.

An instruction can transition through stages of: fetching, dispatching, execution, and retirement. Fetching acquires an instruction from memory, such as an instruction cache. Dispatching controls when the instruction is sent to an execution unit. Execution can be performed in different units depending upon the type of instruction, e.g., fixed point versus floating point. The instruction can complete execution in one cycle or in multiple cycles, again depending upon the instruction type. Upon execution completion, put away may be performed to update certain registers. The instruction is retired at the end of an operation, making any final changes to the state of the processor 105 and performing instruction checkpointing to capture a known good state of the processor 105.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

The branch predictor processes described herein are part of the processor 105.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

In an exemplary embodiment, where the branch predictor processes are implemented in hardware, the branch predictor processes described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 2:
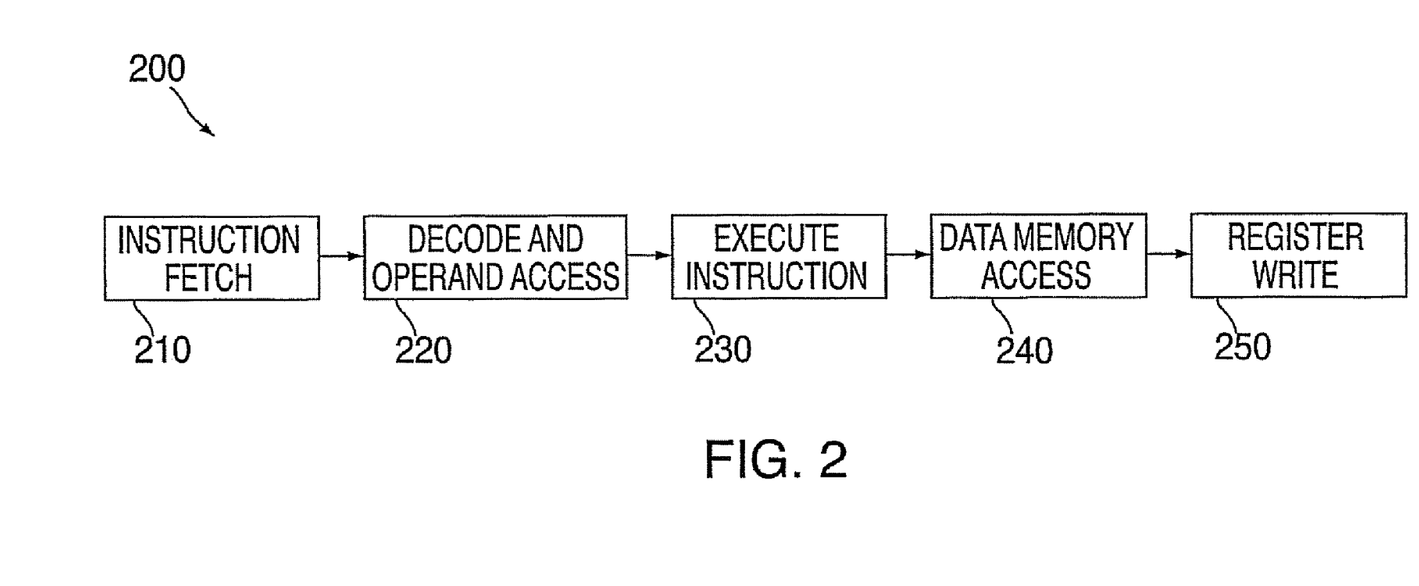
FIG. 2 illustrates a block diagram of a processor instruction pipeline system in which the exemplary branch predictor processes can be implemented in accordance with an exemplary embodiment.

FIG. 2 illustrates a block diagram of a processor instruction pipeline system 200 in which the exemplary branch predictor processes can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions that can include arithmetic logic unit (ALU) operations. The Data memory access 240 stage performs any data memory access functions associated with the instruction. The Write Register write 250 stage writes the appropriate result value into the register file. As described above, the pipeline system 200 can be enhanced by the branch predictor processes by an enhanced performance hierarchical branch predictor that conserves power. A repeating loop of high confidence branch predictions can be detected, which is then used to determine which levels of the prediction hierarchy are needed for providing accurate branch predictions. Any levels of the hierarchy that are not needed to predict the branches in the loop can be turned off in order to save power.

Figure 3:
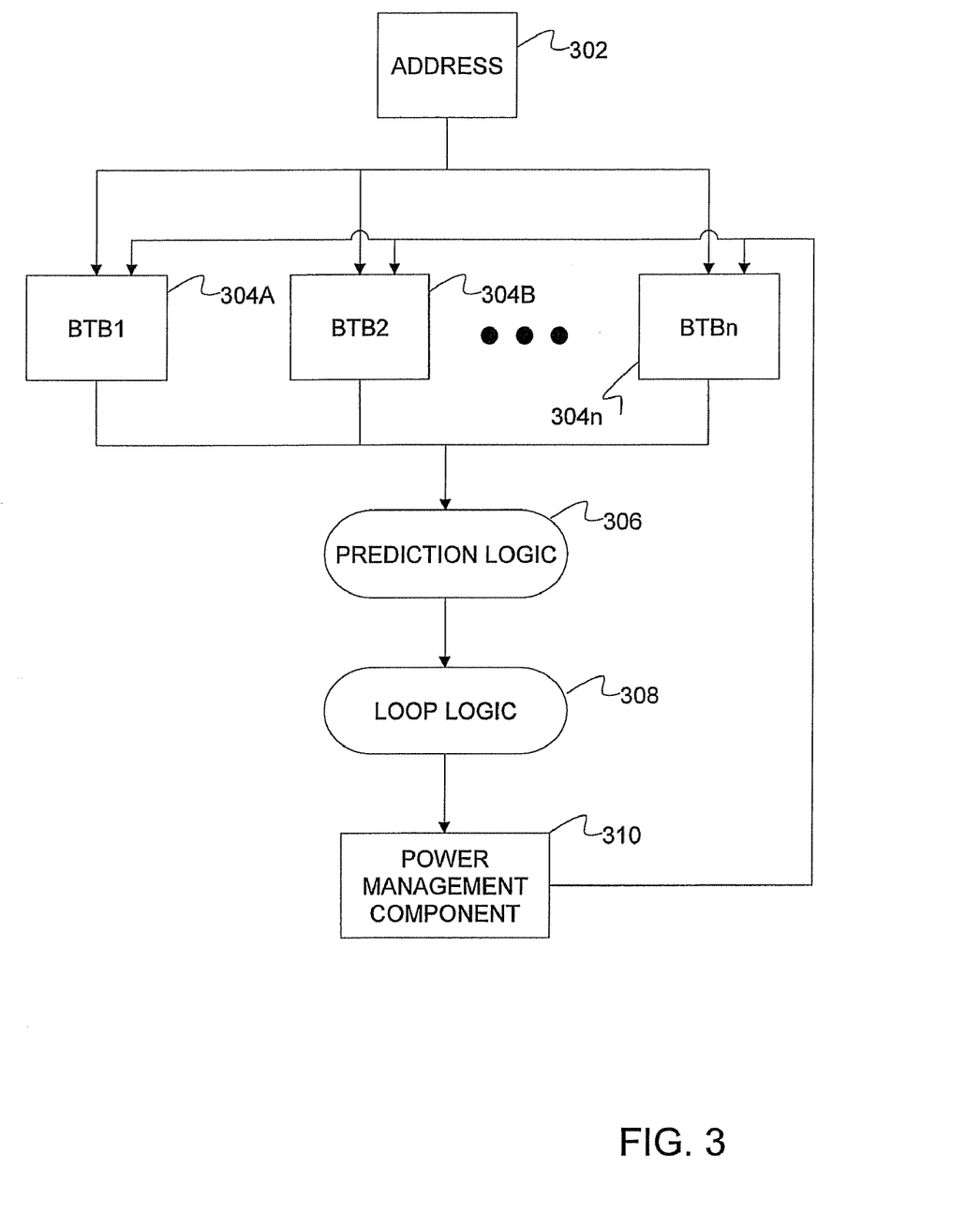
FIG. 3 illustrates hierarchical branch predictor structures and prediction/loop logic with respect to the pipeline of FIG. 2 in accordance with an exemplary embodiment.

FIG. 3 illustrates features and components of the branch predictor system in accordance with an exemplary embodiment. The branch predictor system is implemented with respect to the pipeline 200 of FIG. 2. The branch predictor processes may be implemented, at least in part, within an instruction fetch unit (IFU) of a processor, e.g., processor 105 of FIG. 1. In an exemplary embodiment, the branch predictor components include an address input 302, which is received by hierarchical branch predictors 304A-304n in parallel. Each of the hierarchical branch predictors 304A-304n may be implemented as a branch target buffer (BTB), where branch predictor 304A represents the smallest and fastest level of the hierarchy and branch predictor 304n represents the largest and slowest level in the hierarchy. In an exemplary embodiment, each BTB stores branch addresses, target addresses, and history data to predict the branch direction (i.e., taken, not taken). Branch address information is stored in order to identify which BTB entry to use for a prediction (e.g., the entry whose branch address is equal to or closest following the search address). The target address is used to initiate instruction fetching for the target of a predicted taken branch. The history data, taken/not-taken, is used to predict the branch's direction as either taken or not-taken based on previous outcomes of the branch. In an alternative embodiment, direction prediction information may come from additional (e.g., hierarchical) structures accessed in parallel with the BTBs. In yet a further embodiment, the each of the predictors 304A-304n may store one or more of branch addresses, target addresses, and history data. In a further embodiment, the branch predictors may store prediction states. Branch address tags may be used to prevent aliasing but may be excluded from the predictors themselves where an entry is elected solely on the basis of the index. Each branch predictor 304A-304n represents a level in the hierarchy, and each branch predictor is a subset of a larger branch predictor.

The branch predictors 304A-304n are each in communication with branch predictor logic 306. Branch predictor logic 306 is in communication with loop logic 308. In an exemplary embodiment, the branch predictor logic 306 is responsible for indexing the branch predictors 304A-304n and analyzing the output to determine whether the output contains branch prediction information for the upcoming instruction stream. Once the branch prediction logic 306 determines that one or more levels of the hierarchy contain information for a branch prediction, it sends out information about that branch prediction including which level of the hierarchy generated the prediction.

As shown in FIG. 3, loop logic 308 is in communication with a power management component 310. The power management component 310, in turn, is in communication with each of the branch predictors 304A-304n. In an exemplary embodiment, the power management component 310 is responsible for turning off power (e.g., power saving) to an array of selected branch predictors. In an alternative exemplary embodiment, the power management component 310 is responsible for turning off clocks for selected branch predictors. Additionally, the power management component 310 is responsible for discontinuing the power saving once these levels of the hierarchy are again needed. In addition, deactivating the power saving may be implemented upon determining that a branch within a loop has been mispredicted or when a constituent prediction has changed. The power deactivation may occur upon a pipeline reset event, such as a mispredicted branch direction, a mispredicted target address, or a non-branch prediction pipeline reset. The selection of branch predictors controlled by the power management component 310 is described further herein.

Figure 4:
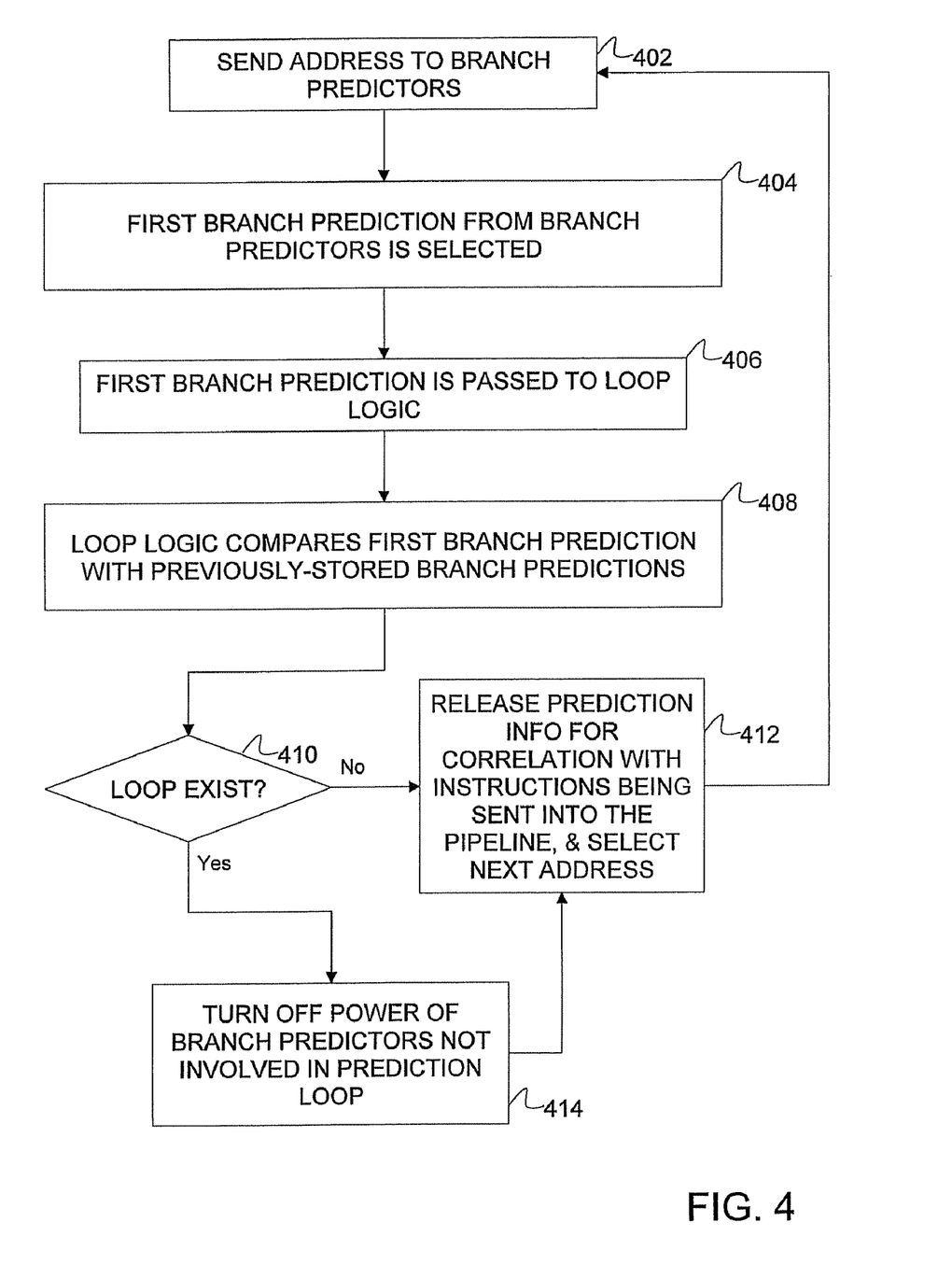
FIG. 4 illustrates a flow chart of a method for implementing a hierarchical branch predictor system with reduced power consumption in accordance with an exemplary embodiment.

FIG. 4 illustrates a flow chart of a method 400 for implementing branch predictor processes in accordance with an exemplary embodiment. For purposes of illustration, the flow described in FIG. 4 illustrates a lookahead prediction system. However, it will be understood by those skilled in the art that other systems may be employed, e.g., overriding prediction system. At step 402, an address is received at the branch predictors 304A-304n in parallel. The first branch prediction returned by the branch predictors is used by the branch predictor processes at step 404. In an alternative embodiment, the address may be sent to the branch predictors in a serial fashion. Additionally, different addresses may be sent to different (selected) branch predictors 304A-304n.

In an exemplary embodiment, branch prediction information about previously encountered branches is stored in BTBn 304n. A subset of these branch predictions is stored in the other levels of the hierarchy 304 where 304A is the smallest and fastest level of the hierarchy. In an exemplary embodiment, the information stored includes the branch instruction address, the target instruction address of taken branches, and branch direction history. The prediction logic 306 receives the first branch prediction as a result of step 404. As indicated above, the prediction logic 306 indexes the branch predictors and analyzes the output to determine whether the output contains branch prediction information. Upon determining that one of the levels of the hierarchy contains information for a branch prediction, it sends out information about that branch prediction including which level of the hierarchy generated the prediction. The prediction logic 306 passes the first branch prediction to the loop logic 308 at step 406. The loop logic 308 compares the first branch prediction with previous fixed number (e.g., three) of branch predictions at step 408. The number of previous branch predictions to be used as the fixed number may vary according to need.

At step 410, the loop logic 308 determines whether a loop exists with respect to the first branch prediction. A loop consists of a sequence of branch predictions that will repeat as long as the constituent predictions of the branches involved do not change. The constituent predictions are the direction (taken vs. not-taken) and target address. Direction and target information are modified after recognizing that a branch prediction was incorrect. In particular, if a branch prediction turns out to be incorrect, then instruction fetching and branch prediction are restarted and the branch predictor updated. The BTB may contain additional information about the predicted branches, such as whether they have been mispredicted before or whether the direction or target prediction will change as a function of a side direction/target predictor, such as a pattern history table or multiple target BTB, which are indexed differently but in parallel, and therefore may be considered as levels of the hierarchy. There are a variety of ways to structure the branch prediction hierarchy and loop detection. For example, only strongly taken branches which have never been mispredicted may be included in the faster levels of the hierarchy (e.g., 304A) and everything else in the larger/slower level(s) of the hierarchy (e.g., 304n or a combination of 304B and 304n). Then, a loop is detected when all of the branches being predicted in the loop are not in BTBn. Alternatively, the levels of the hierarchy 304 may contain a more general subset except for branches which may require changing direction or target predictions. Upon detecting a changed direction or target, all branch prediction structures would be re-enabled since the change has broken out of the detected loop.

If a loop is not detected, prediction information for correlation with instructions being sent into the pipeline 200 are released for processing at step 412, and the process returns to step 402 whereby the next address is selected and searched. Otherwise, if a loop is detected, the branch predictors not involved in predicting the branches in the loop are turned off by the power management component 310 at step 414, followed by releasing the instruction associated with the address to the pipeline 200 for processing at step 412.

It will be understood that a single branch prediction may be a function of the contents of more than one level of the hierarchy 304, in which case these levels remain powered when such a branch prediction is part of a loop. This is possible even with levels of different latencies because the contents of one level may reference for information from a slower level of the hierarchy.

Figure 5:
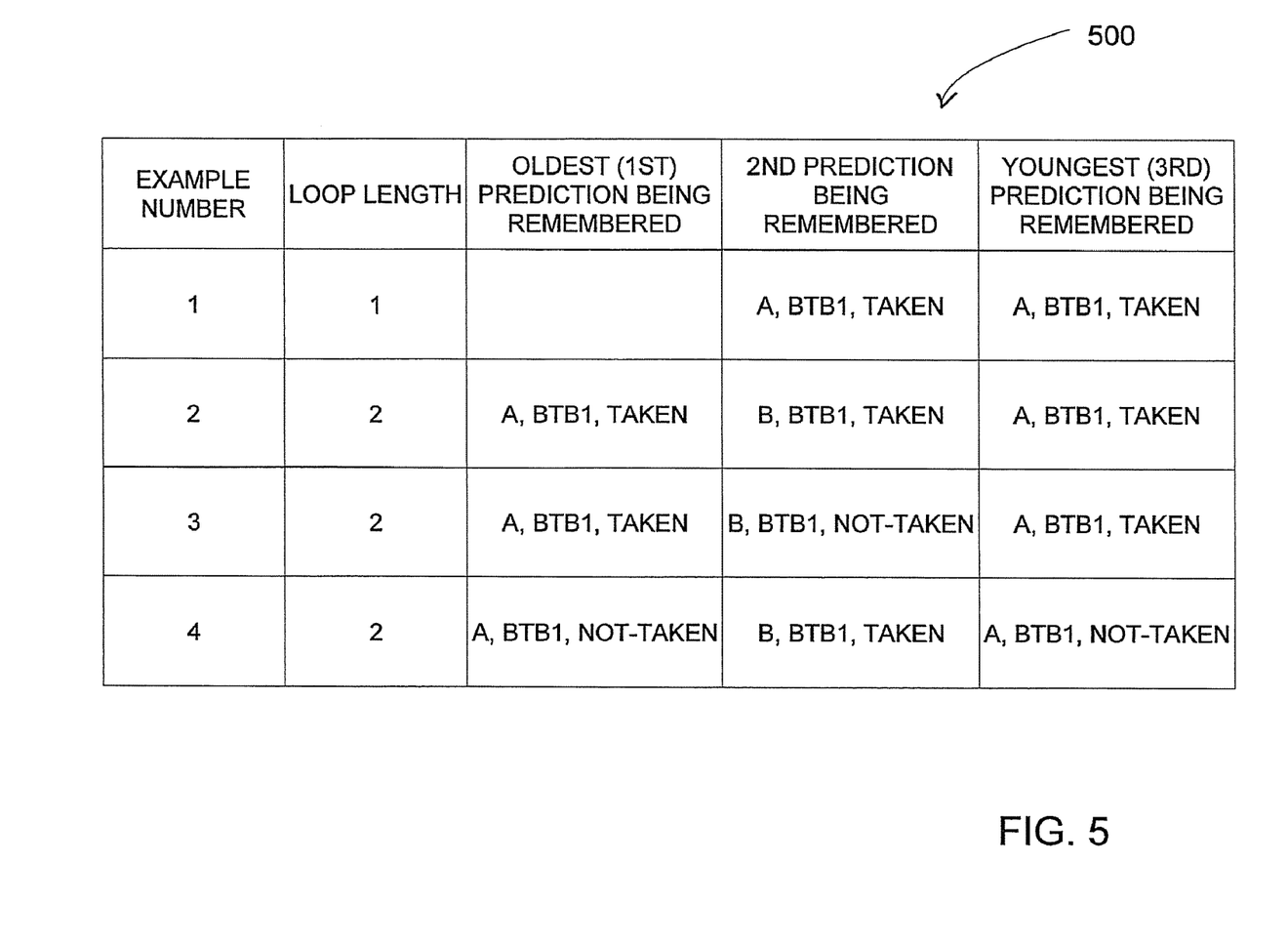
FIG. 5 illustrates a table including examples of loops that may be detected by the hierarchical branch predictor processes in an exemplary embodiment.

Turning now to FIG. 5, a table 500 illustrates examples of loops which could be detected by remembering the three most recent branches in a two-level hierarchical predictor system. Upon detecting such loops, the branch predictor involved in the loop (e.g., BTB1), would need to remain active. As shown in FIG. 5, entries are expressed as branch instruction identifier (e.g., A,B), the branch predictor that made the prediction (e.g., BTB1), and a direction prediction for each detected loop (e.g., taken, not-taken).

As a result of the summarized invention, the systems and methods and described herein provide an enhanced performance hierarchical branch predictor that conserves power. A repeating loop of branch predictions can be detected, which is then used to determine which levels of the prediction hierarchy are needed for providing accurate branch predictions. Any levels of the hierarchy that are not needed to predict the branches in the loop are turned off in order to save power.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for power conservation in a hierarchical branch predictor system, comprising:
    addressing multiple branch predictors in parallel or sequentially, each of the branch predictors comprising various sizes of hierarchical storage, the branch predictors storing information about previously encountered branch instructions;
    comparing the first branch prediction with previously-stored branch predictions to determine the existence of a branch prediction loop responsive to receiving a first branch prediction from one or more of the branch predictors, the branch prediction loop including a sequence of branch predictions that repeat as long as constituent predictions of the branches remain unchanged;
    associating the branch prediction loop with the branch predictors that provided each branch prediction responsive to determining that a branch prediction loop exists;
    activating power saving on the branch predictors that are not associated with the branch prediction loop; and
    deactivating power saving upon determining that branch predictions are needed from branch predictors not associated with the branch prediction loop.

2. The method of claim 1, wherein the multiple branch predictors vary in size and access latency.

3. The method of claim 1, wherein the first branch prediction is generated by sending addresses to the multiple branch predictors in order to select corresponding entries from the multiple branch predictors, and analyzing the selected entries to predict information about the predicted branch, the information predicted including at least one of:
    the presence of a branch at a predicted branch address;
    the predicted branch's direction; and
    the predicted branch's target address.

4. The method of claim 1, wherein comparing the first branch prediction to previously stored branch predictions is performed through tracking previous prediction information and where previous predictions were made from within the branch predictor hierarchy.

5. The method of claim 1, wherein activating power saving includes turning off power to an array of the branch predictors that are not associated with the branch prediction loop.

6. The method of claim 1, wherein activating power saving includes turning off clocks that support the branch predictors that are not associated with the branch prediction loop.

7. The method of claim 1, wherein deactivating power saving occurs upon a pipeline reset event including at least one of:
    a mispredicted branch direction;
    a mispredicted target address; and
    a non-branch prediction pipeline reset.

8. The method of claim 1, wherein deactivating power saving occurs upon detecting a change in the prediction information for one of the branches in the branch prediction loop.

9. A system for conserving power in a hierarchical branch predictor system, comprising:
    a processor;
    multiple branch predictors, each of the branch predictors comprising various sizes of hierarchical storage, the branch predictors storing information about previously encountered branch instructions; and
    predictor logic and loop logic implemented by the processor, the predictor logic and the loop logic collectively performing a method, comprising:
        addressing the multiple branch predictors in parallel or sequentially;
        comparing the first branch prediction with previously-stored branch predictions to determine the existence of a branch prediction loop responsive to receiving a first branch prediction from one or more of the branch predictors, the branch prediction loop including a sequence of branch predictions that repeat as long as constituent predictions of the branches remain unchanged;
        associating the branch prediction loop with the branch predictors that provided each branch prediction, responsive to determining that a branch prediction loop exists;
        activating power saving on the branch predictors that are not associated with the branch prediction loop; and
        deactivating power saving upon determining that branch predictions are needed from branch predictors not associated with the branch prediction loop.

10. The system of claim 9, wherein the multiple branch predictors vary in size and access latency.

11. The system of claim 9, wherein the first branch prediction is generated by sending addresses to the multiple branch predictors in order to select corresponding entries from the multiple branch predictors, and analyzing the selected entries to predict information about the predicted branch, the information predicted including at least one of:
    the presence of a branch at a predicted branch address;
    the predicted branch's direction; and
    the predicted branch's target address.

12. The system of claim 9, wherein comparing the first branch prediction to previously stored branch predictions is performed through tracking previous prediction information and where previous predictions were made from within the branch predictor hierarchy.

13. The system of claim 9, wherein activating power saving includes turning off power to an array of the branch predictors that are not associated with the branch prediction loop.

14. The system of claim 9, wherein activating power saving includes turning off clocks that support the branch predictors that are not associated with the branch prediction loop.

15. The system of claim 9, wherein deactivating power saving occurs upon a pipeline reset event including at least one of:
    a mispredicted branch direction;
    a mispredicted target address; and
    a non-branch prediction pipeline reset.

16. The system of claim 9, wherein deactivating power saving occurs upon detecting a change in the prediction information for one of the branches in the branch prediction loop.

* * * * *